Dec. 6, 1932.  B. TALBOT  1,890,007
LINING OR COATING OF PIPES AND OTHER TUBULAR BODIES
Filed Nov. 29, 1927
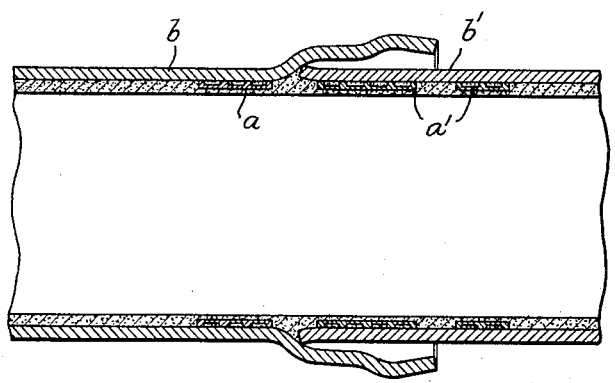

Patented Dec. 6, 1932

1,890,007

UNITED STATES PATENT OFFICE

BENJAMIN TALBOT, OF MIDDLESBROUGH, ENGLAND, ASSIGNOR TO THE TALBOT NON-CORROSIVE LININGS COMPANY, OF PHILADELPHIA, PENNSYLVANIA, A CORPORATION OF DELAWARE

LINING OR COATING OF PIPES AND OTHER TUBULAR BODIES

Application filed November 29, 1927, Serial No. 236,557, and in Great Britain February 18, 1927.

This invention relates primarily to the manufacture of pipes or the like having a lining of a material which, in a semi-viscous or fluid condition, is applied to and distributed over the interior surface of the pipe by centrifugal action and which sets on cooling or drying to form a hard internal lining. The material used may be cement or concrete or it may be a bituminous material with or without the admixture of an inert loading material, such as slag, a suitable kind of rock, slaked lime or any other suitable material which is either naturally in, or is for the purpose reduced to, a powdery or comminuted condition.

One object of the invention is to prevent damage to such linings when two lengths of pipe or the like are brought together and joined end to end, as for example, when the pipes are connected by a spigot and faucet joint. In such a case, when the jointing material is forced into the faucet or socket, the lining in either or both of the contiguous ends is liable to be fractured and broken off from the pipe by shocks to the latter due, for example, to the blows of the caulking tool.

According to the invention, before the lining is applied centrifugally to a length of pipe or the like, one or both of the ends of the pipe are provided with one or more rings of keying elements formed in casting upon or secured around the inner surface of the pipe end by any suitable means, so that the lining afterwards applied centrifugally to the pipe is firmly keyed to the metal, and any stress or jar involved in jointing two lengths of pipe is less liable to result in fracture of the lining due to shocks inseparable from the jointing operation.

The keying elements may take a variety of forms, as for example, one or more rows of headed pins rigidly secured around the inside of the pipe end or ends as by autogenous welding. Or they may be constituted by a ring or rings of expanded metal similarly or otherwise secured to the pipe ends, or any other suitable keying device may be used, provided it is of a character to become interlocked with the centrifugally applied lining, either by being embedded therein or otherwise, and to provide means for ensuring that jars or stresses which may occur in jointing two sections of the pipe are not taken wholly by the lining.

The accompanying drawing shows in longitudinal section a spigot and faucet junction for a centrifugally lined pipe, in which $a$, $a'$ represent rings of expanded metal which are electrically welded or otherwise firmly secured around the inner surfaces of the ends $b$, $b'$ of lengths of the metal piping. Consequently, the lining around the inner surfaces at the ends of the pipes will be firmly keyed to the pipes, so that any jar or shock which may occur when the joint is made will be less liable to fracture or break the lining around the pipe ends.

After the joint is made on the outside of the spigot end, the lining of the two pipes is made continuous by melting into the space left between the linings at the jointed ends lining material of a similar nature to that used for the linings and smoothed over by ironing with a hot iron.

The same kind of device may be applied to the outside surfaces of pipe ends which have an external adherent protective coating of any suitable character, for example, the keying device or elements may be applied to the outside of the spigot end of a pipe, as well as to the interior thereof, if such pipe has an external coating as well as an inside lining.

Having thus described the nature of the said invention and the best means I know of carrying the same into practical effect, I claim:—

A pipe composed of sections connected by a bell and spigot joint, each of said sections having a concentric annulus projecting from the surface thereof adjacent to but retracted from the joint between said sections, said sections being spaced sufficiently for the introduction of joineing-material between said annuli, a coating keyed to said sections by said annuli, and jointing material disposed between said annuli, said coating being held by said annuli against fracturing action of said jointing material.

In witness whereof I have signed my name to this specification.

BENJAMIN TALBOT.